(12) United States Patent
Malik (10) Patent No.: US 10,619,751 B2
(45) Date of Patent: Apr. 14, 2020

(54) EXHAUST GAS CONTROL VALVE AND ASSEMBLY INCLUDING THE SAME

(71) Applicant: BorgWarner Inc., Auburn Hills, MI (US)

(72) Inventor: Petr Malik, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 73 days.

(21) Appl. No.: 16/127,567

(22) Filed: Sep. 11, 2018

(65) Prior Publication Data

US 2020/0080654 A1    Mar. 12, 2020

(51) Int. Cl.

| | |
|---|---|
| *F16K 15/18* | (2006.01) |
| *F01N 13/10* | (2010.01) |
| *F02B 37/18* | (2006.01) |
| *F02M 26/66* | (2016.01) |
| *F02M 26/67* | (2016.01) |
| *F02M 26/72* | (2016.01) |
| *F01N 1/08* | (2006.01) |

(52) U.S. Cl.
CPC .............. *F16K 15/18* (2013.01); *F01N 13/10* (2013.01); *F02B 37/186* (2013.01); *F02M 26/66* (2016.02); *F02M 26/67* (2016.02); *F01N 1/08* (2013.01); *F02B 37/183* (2013.01); *F02M 26/72* (2016.02)

(58) Field of Classification Search
CPC ........ F16K 15/18; F02M 26/66; F02M 26/67; F02M 26/72; F02B 37/183; F02B 37/186
See application file for complete search history.

(56) References Cited

U.S. PATENT DOCUMENTS

| | | | |
|---|---|---|---|
| 2015/0330335 A1* | 11/2015 | Shimada | F02D 41/22 123/568.16 |
| 2017/0145911 A1 | 5/2017 | Takahashi et al. | |
| 2019/0049028 A1* | 2/2019 | Beuschel | F16K 15/18 |

\* cited by examiner

*Primary Examiner* — Audrey K Bradley
(74) *Attorney, Agent, or Firm* — Howard & Howard Attorneys PLLC (57) ABSTRACT

An exhaust gas control valve for regulating a flow of exhaust gas includes a housing having an interior wall defining a housing interior, a yoke disposed in the housing interior and having a length and an axis extending along the length, with the yoke being moveable between a first and second yoke position. The exhaust gas control valve further includes a valve member including a valve shaft and a valve body. The valve member is moveable between a first valve position and a second valve position. The exhaust gas control valve also includes a retainer coupled to the yoke, and a biasing member disposed in the housing interior and coupled to the yoke and the retainer to bias the yoke and the retainer in opposite directions, with the biasing member being configured to prevent free play of the yoke and the valve member with respect to said housing.

23 Claims, 6 Drawing Sheets

EXHAUST GAS CONTROL VALVE AND ASSEMBLY INCLUDING THE SAME

BACKGROUND OF THE INVENTION

1. Field of the Invention

The present invention relates generally to an exhaust gas control valve for regulating a flow of exhaust gas, and an assembly including the exhaust gas control valve.

2. Description of the Related Art

Conventional exhaust gas control valves are used to regulate a flow of exhaust gas produced from an internal combustion engine. Exhaust gas control valves are used in various applications and can be employed as an exhaust gas recirculation (EGR) valve, a bypass valve, an exhaust tuning valve, and the like.

Typical exhaust gas control valves include a housing having an interior wall defining a housing interior, and a yoke disposed in the housing interior and having a length and an axis extending along the length, with the yoke being moveable between a first yoke position and a second yoke position different from the first yoke position along the axis. Typical exhaust gas control valves further include a valve member coupled to and moveable with the yoke, where the valve member is moveable along the axis between a first valve position when the yoke is in the first yoke position and a second valve position when the yoke is in the second yoke position to regulate the flow of exhaust gas.

In conventional exhaust gas control valves, the yoke moves in response to actuation of an actuator to move the valve member to control the flow of exhaust gas. Specifically, the yoke moves in the housing interior in response to the actuation of the actuator, which then moves the valve member between the first and second valve positions to regulate the flow of exhaust gas. The first valve position is typically a closed position, which restricts the flow of exhaust gas. The second valve position is typically an open position, which allows the flow of exhaust gas. For example, when the conventional exhaust gas control valve is an EGR valve, the valve member moves between the first and second valve positions to regulate the flow of exhaust gas from a high pressure exhaust source, such as an output of the internal combustion engine from an exhaust manifold, to a low pressure chamber, such as an intake of the internal combustion engine.

When the valve member is in the first valve position, the valve member separates the high pressure exhaust source from the low pressure chamber. In such situations, the valve member is susceptible to pulsation from the flow of exhaust gas from the high pressure exhaust source. Specifically, the pulsation of the exhaust gas from the internal combustion engine causes the valve member in conventional exhaust gas control valves to move axially due to free play between the various components in the exhaust gas control valve.

Having the valve member move axially during pulsation of the exhaust gas increases the risk of breaking the yoke, the valve member, and various other components in the exhaust gas control valve. Specifically, in such situations where there is free play between components of the exhaust gas control valve, the yoke and/or valve member repeatedly engage the housing, which causes rattling and unwanted noise, vibration, harshness, and wear on the yoke and/or valve member. Similarly, in certain environments, the valve member has a valve shaft disposed in the housing interior, and the valve shaft may similarly engage the valve housing, which causes rattling and unwanted wear on the valve shaft. Any rattling of components of the exhaust gas control valve is detrimental to the performance and structural integrity of the exhaust control valve.

As such, there remains a need to provide an improved exhaust gas control valve.

SUMMARY OF THE INVENTION AND ADVANTAGES

An exhaust gas control valve for regulating a flow of exhaust gas includes a housing having an interior wall defining a housing interior. The exhaust gas control valve also includes a yoke disposed in the housing interior and having a length and an axis extending along the length, with the yoke being moveable between a first yoke position and a second yoke position different from the first yoke position along the axis. The exhaust gas control valve further includes a valve member including a valve shaft having a first shaft end disposed in the housing interior and coupled to the yoke and a second shaft end spaced from the first shaft end, and a valve body adjacent the second shaft end and disposed outside the housing interior and coupled to and moveable with the valve shaft. The valve member is moveable along the axis between a first valve position when the yoke is in the first yoke position and a second valve position when the yoke is in the second yoke position to regulate the flow of exhaust gas. The exhaust gas control valve also includes a retainer disposed in the housing interior and coupled to the yoke. The retainer is moveable with the yoke when the yoke moves between the first and second yoke positions, and the retainer is engageable with the interior wall when the yoke is in the first yoke position. The exhaust gas control valve further includes a biasing member disposed in the housing interior and coupled to the yoke and the retainer to bias the yoke and the retainer in opposite directions with respect to one another along the axis such that the retainer and the yoke are moveable with respect to one another along the axis. The biasing member is configured to prevent free play of the yoke and the valve member with respect to said housing when the yoke is in the first yoke position Accordingly, the exhaust gas control valve including the retainer being engageable with the interior wall when the yoke is in the first yoke position, and the biasing member coupled to the yoke and the retainer prevents free play of the yoke and valve member with respect to the housing and, therefore, reduces rattling and unwanted noise, vibration, harshness, and wear on the yoke and/or valve member.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
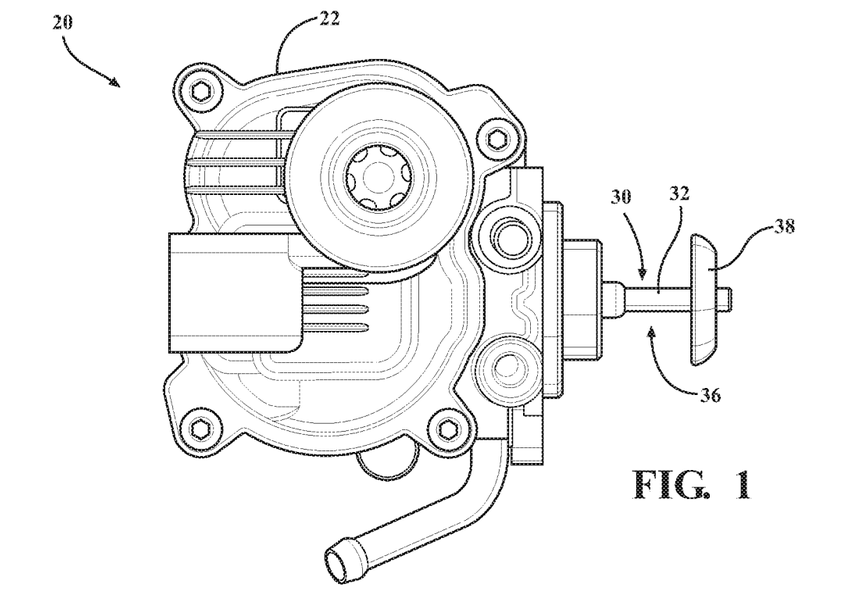
FIG. 1 is a side view of an exhaust gas control valve including a housing and a valve member.

With reference to the Figures, wherein like numerals indicate like parts throughout the several views, an exhaust gas control valve 20 for regulating a flow of exhaust gas is generally shown in FIG. 1. The exhaust gas control valve 20 may be used in various applications, and may be configured to be used as an exhaust gas recirculation (EGR) valve, a bypass valve, an exhaust tuning valve, and the like.

Figure 5:
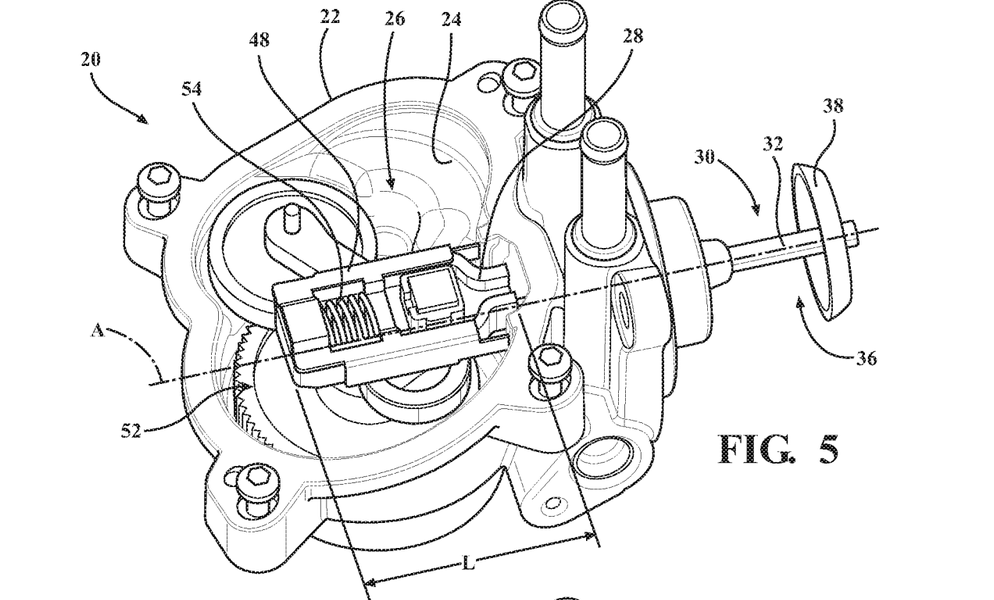
FIG. 5 is a perspective view of the exhaust gas control valve, with the yoke being in a first yoke position, the valve member being in a first valve position, and the retainer being engaged with an interior wall of the housing to prevent contact of the yoke with the interior wall.
Figure 6:
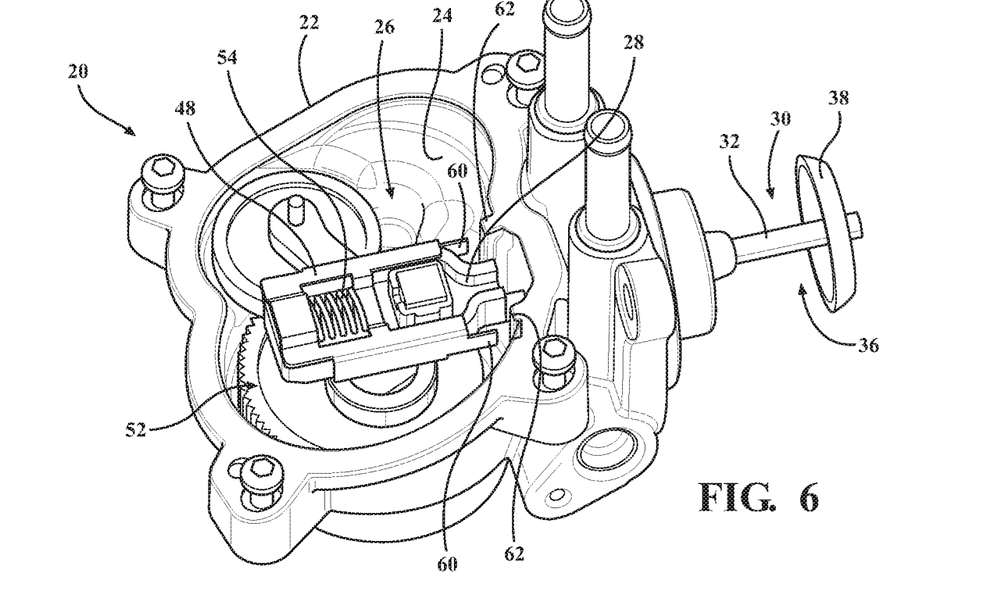
FIG. 6 is a perspective view of the exhaust gas control valve, with the yoke being in a second yoke position, the valve member being in a second valve position, and the retainer being disengaged with the interior wall of the housing.

With reference to FIG. 5, the exhaust gas control valve 20 includes a housing 22 having an interior wall 24 defining a housing interior 26. The exhaust gas control valve 20 includes a yoke 28 disposed in the housing interior 26 and having a length L and an axis A extending along the length L. The yoke 28 is moveable between a first yoke position, as shown in FIG. 5, and a second yoke position different from the first yoke position along the axis A, as shown in FIG. 6.

As shown in FIGS. 1-4, the exhaust gas control valve 20 includes a valve member 30 including a valve shaft 32 having a first shaft end 34 disposed in the housing interior 26 and coupled to the yoke 28 and a second shaft end 36 spaced from the first shaft end 34. The valve member 30 also includes a valve body 38 adjacent the second shaft end 36 and disposed outside the housing interior 26 and coupled to and moveable with the valve shaft 32. The valve member 30 is moveable along the axis between a first valve position when the yoke 28 is in the first yoke position, as shown in FIG. 5, and a second valve position when the yoke 28 is in the second yoke position, as shown in FIG. 6, to regulate the flow of exhaust gas.

Figure 7:
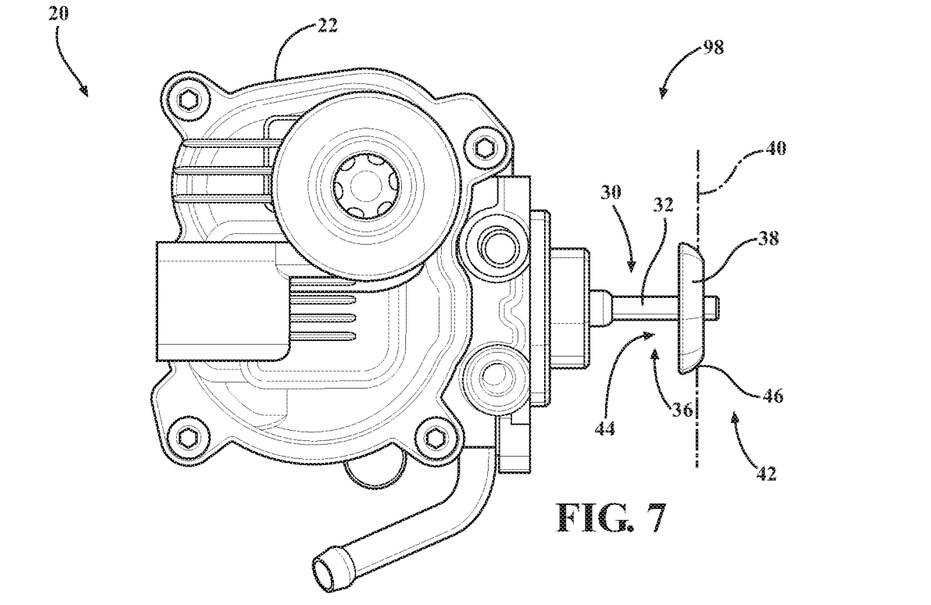
FIG. 7 is a side view of the exhaust gas control valve configured as a pull to open exhaust gas control valve.
Figure 8:
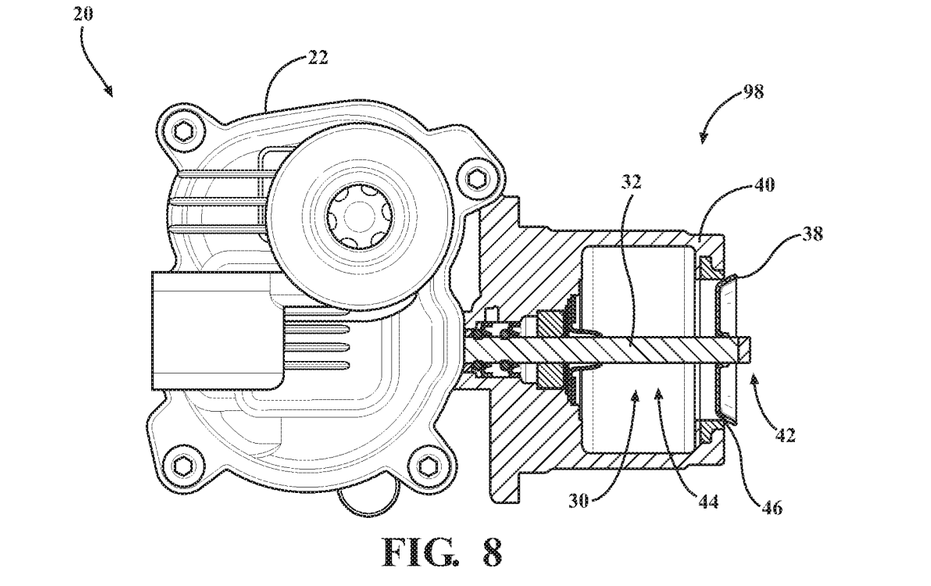
FIG. 8 is a side cross-sectional view of the exhaust gas control valve configured as a push to open exhaust gas control valve.

The valve body 38 is typically moveable by the valve shaft 32 along the axis A to regulate the flow of exhaust gas. For example, as shown in FIGS. 7 and 8, the valve body 38 is typically engageable with an exhaust housing 40 for regulating the flow of exhaust gas. Specifically, the exhaust housing 40 divides a high pressure side 42, and a low pressure side 44, and the valve body 38 is typically engageable with the exhaust housing 40 to regulate the flow of exhaust gas between the high pressure side 42 and low pressure side 44. For example, when the valve body 38 is engaged with the exhaust housing 40, the valve body 38 restricts the flow of exhaust gas between the high pressure side 42 into the low pressure side 44. When the valve body 38 is disengaged from the exhaust housing 40, the valve body 38 allows the flow of exhaust gas between the high pressure side 42 and the low pressure side 44. As described in further detail below, the valve body 38 and, specifically, the valve member 30 regulating the flow of exhaust gas, is susceptible to pulsation of the exhaust gas. In one embodiment, the valve member 30 may be further defined as a poppet valve. In such embodiments, the exhaust housing 40 may define a valve seat 46 for the valve body 38 of the valve member 30 to engage to regulate the flow of exhaust gas between the high pressure side 42 and the low pressure side 44. Additionally, in such embodiments, the exhaust gas control valve 20 may be referred to as a poppet valve assembly.

As shown in FIG. 7, the exhaust gas control valve 20 may be configured as a pull to open exhaust gas control valve 20. In other words, the valve member 30 is pulled by the yoke 28 to unseat the valve body 38 from the valve seat 46 to allow the flow of exhaust gas between the high pressure side 42 and the low pressure side 44. As shown in FIG. 8, the exhaust gas control valve 20 may be configured as a push to open exhaust gas control valve 20. In other words, the valve member 30 is pushed by the yoke 28 to unseat the valve body 38 from the valve seat 46 to allow the flow of exhaust gas between the high pressure side 42 and the low pressure side 44.

With particular reference to FIG. 5, the exhaust gas control valve 20 further includes a retainer 48 disposed in the housing interior 26 and coupled to the yoke 28. The retainer 48 is moveable with the yoke 28 when the yoke 28 moves between the first and second yoke positions. The retainer 48 is engageable with the interior wall 24 when the yoke 28 is in the first yoke position. Typically, the retainer 48 prevents contact of the yoke 28 with the interior wall 24. The retainer 48 of the exhaust gas control valve 20 preventing contact of the yoke 28 with the interior wall 24 helps increase the life of the yoke 28 and, in turn, the exhaust gas control valve 20 as a whole, which decreases cost and repairs needed for the exhaust gas control valve 20. Also, preventing contact of the yoke 28 with the interior wall 24 increases performance of the exhaust gas control valve 20.

The exhaust gas control valve 20 additionally includes a biasing member 54 disposed in the housing interior 26 and coupled to the yoke 28 and the retainer 48 to bias the yoke 28 and the retainer 48 in opposite directions with respect to one another along the axis A such that the retainer 48 and the yoke 28 are moveable with respect to one another along the axis A. The biasing member 54 is configured to prevent free play of the yoke 28 and the valve member 30 with respect to the housing 22 when the yoke 28 is in the first yoke position. It is to be appreciated that the biasing member 54 may also be configured to prevent free play of the yoke 28 and the valve member 30 when the yoke 28 is in the second yoke position. It is also to be appreciated that the biasing member 54 may be configured to prevent free play of the yoke 28 and the valve member 30 with respect another component of the exhaust gas control valve 20, such as a bushing or bearing, when the yoke 28 is in the first yoke position.

Having the biasing member 54 coupled to the yoke 28 and the retainer 48 to bias the yoke 28 and the retainer 48 in opposite directions with respect to one another along the axis A reduces rattling and unwanted noise, vibration, harshness, and wear on the yoke 28 and the valve member 30 caused from free play of the yoke 28 and the valve member 30. Additionally, during pulsation of the exhaust gas, the retainer 48 may allow movement of the yoke 28, but the biasing member 54 biases the yoke 28 and retainer 48 in opposite directions as the pulsation of the exhaust gas repeatedly moves the yoke 28 along the axis A. Specifically, the retainer 48 and the biasing member 54 may prevent the valve shaft 32 of the valve member 30 from engaging the housing 22 during movement of the valve member 30 between the first and second valve positions, which is especially true during pulsation of the exhaust gas. Having the biasing member 54 coupled to the retainer 48 and the yoke 28 also helps prevent free play of the yoke 28 and the valve member 30 with respect to the housing 22, which reduces rattling of the yoke 28, the valve member 30, and optionally other components of the exhaust gas control valve 20. Reducing free play, unwanted movement, lost motion, and rattling of the yoke 28, the valve member 30, and optionally other components of the exhaust gas control valve 20 prevents fracturing or other failures of the yoke 28, the valve member 30, and optionally other components of the exhaust gas control valve 20, which is detrimental to the performance and longevity of the exhaust gas control valve 20.

Typically, the biasing member 54 is configured to bias the yoke 28 away from the interior wall 24 to prevent contact of the yoke 28 with the interior wall 24. For example, as shown in FIG. 5, when the retainer 48 is engaged with the interior wall 24, the biasing member 54 biases the yoke 28 away from the interior wall 24 such that the yoke 28 does not contact the interior wall 24 of the housing 22. Having the biasing member 54 bias the yoke away from the interior wall 24 prevents contact of the yoke 28 and the interior wall 24, which increases the life of the exhaust gas control valve 20, as described in detail above.

Figure 2:
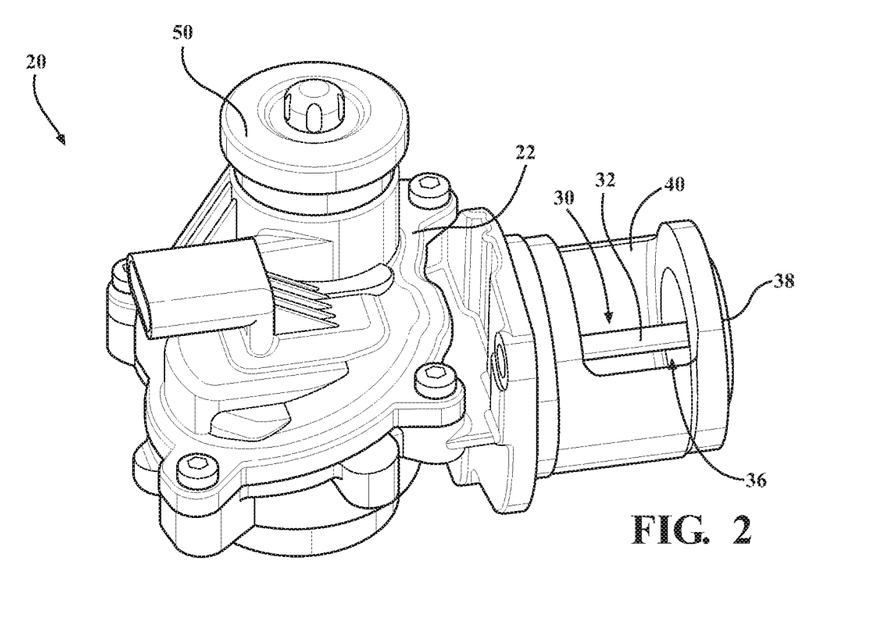
FIG. 2 is a perspective view of the exhaust gas control valve.
Figure 3:
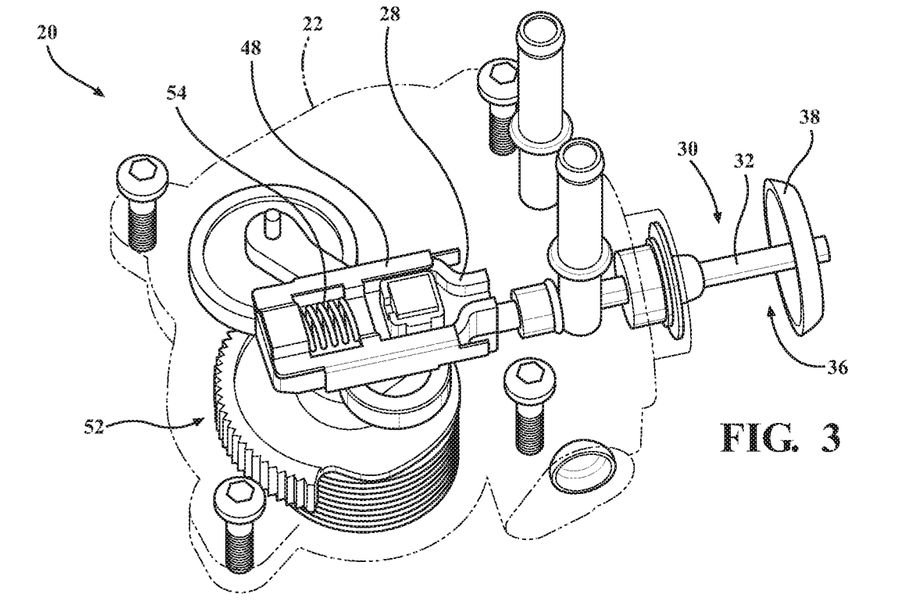
FIG. 3 is a perspective view of the exhaust gas control valve, with the housing being shown in phantom, and with the exhaust gas control valve including a yoke having a length and an axis extending along the length, a retainer coupled to the yoke, and a biasing member coupled to the yoke and the retainer.
Figure 4:
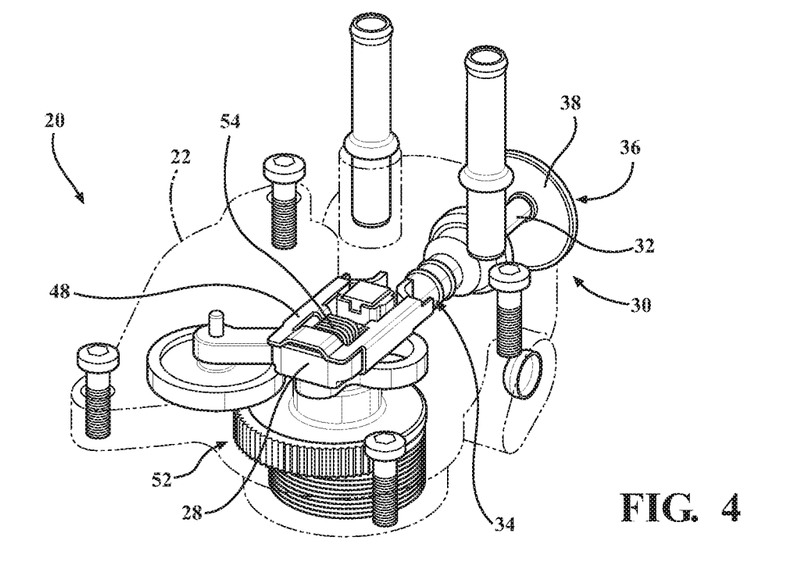
FIG. 4 is another perspective view of the exhaust gas control valve.

The exhaust gas control valve 20 may include an actuator 50, as shown in FIG. 2, coupled to the housing 22. In such embodiments, the yoke 28 is moveable between the first and second yoke positions when the actuator 50 is actuated. Actuation of the actuator 50 may be controlled by a controller (not shown). The actuator 50 may be any suitable actuator for moving the yoke 28 between the first and second yoke positions. For example, the actuator 50 may be a brush direct current motor, brushless direct current motor, stepper motor, or a direct drive actuator, such as a torque motor.

In one embodiment, the retainer 48 is slideably coupled to the yoke 28 such that the yoke 28 is moveable with respect to the retainer 48 along the axis A when the retainer 48 is engaged with the interior wall 24 to absorb movement of the valve member 30 along the axis A.

To help facilitate movement of the yoke 28, the exhaust gas control valve 20 may include a gear train 52 disposed in the housing interior 26 and coupled to the actuator 50, with the gear train 52 being configured to be actuated by the actuator 50 for moving the yoke 28 between the first and second yoke positions. When present, the gear train 52 may be rotatable when actuated by the actuator 50, and the yoke 28 may be configured to translate rotational motion of the gear train 52 into linear motion when the yoke 28 moves between the first and second yoke positions along the axis A.

The retainer 48 may be disengaged from the interior wall 24 when the yoke 28 is in the second yoke position, as shown in FIG. 6, and the yoke 28 may be spaced from the interior wall 24 when the yoke 28 is in the second yoke position such that the yoke 28 does not contact the interior wall 24. Said differently, the yoke 28 and the retainer 48 may be disengaged from the interior wall 24 when the yoke 28 is in the second yoke position. Typically, as shown in FIG. 5, when the yoke 28 is in the first yoke position, the retainer 48 is engaged with the interior wall 24 to prevent contact of the yoke 28 with the interior wall 24.

Figure 10:
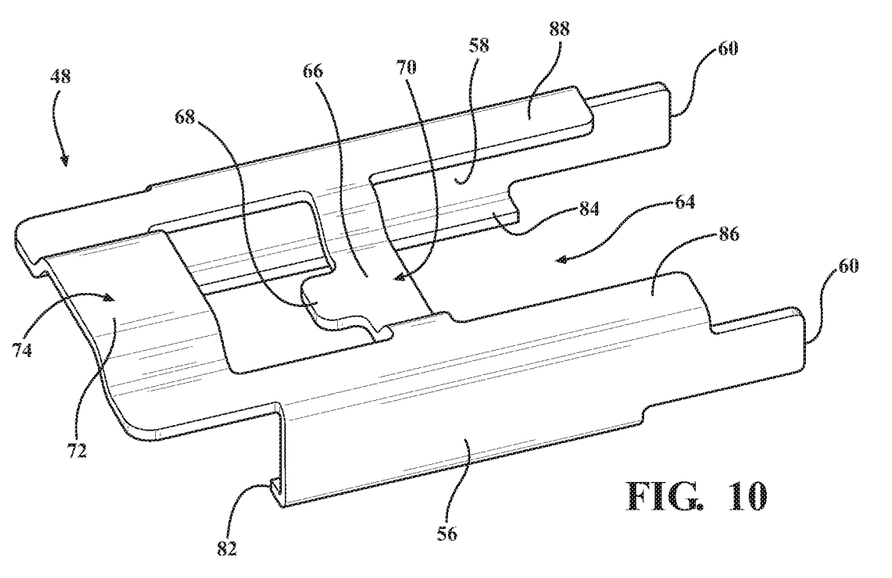
FIG. 10 is a perspective view of the retainer.
Figure 11:
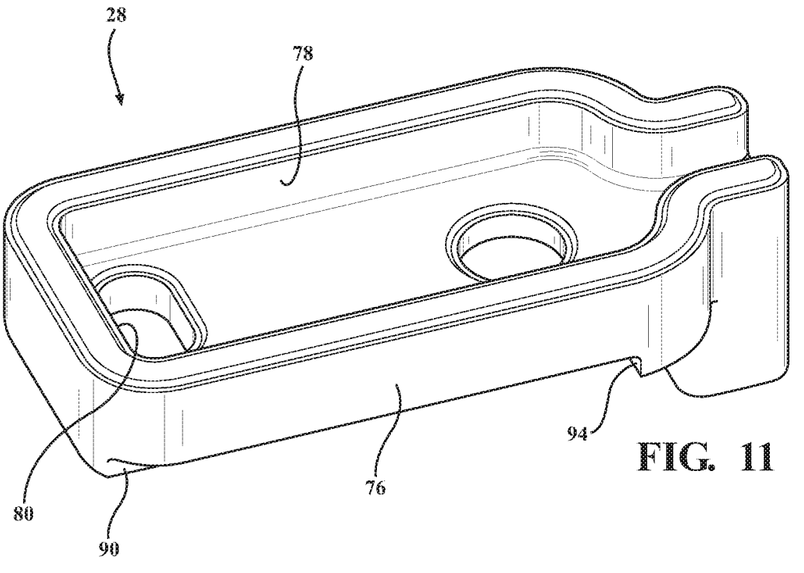
FIG. 11 is a perspective view of the yoke.
Figure 12:
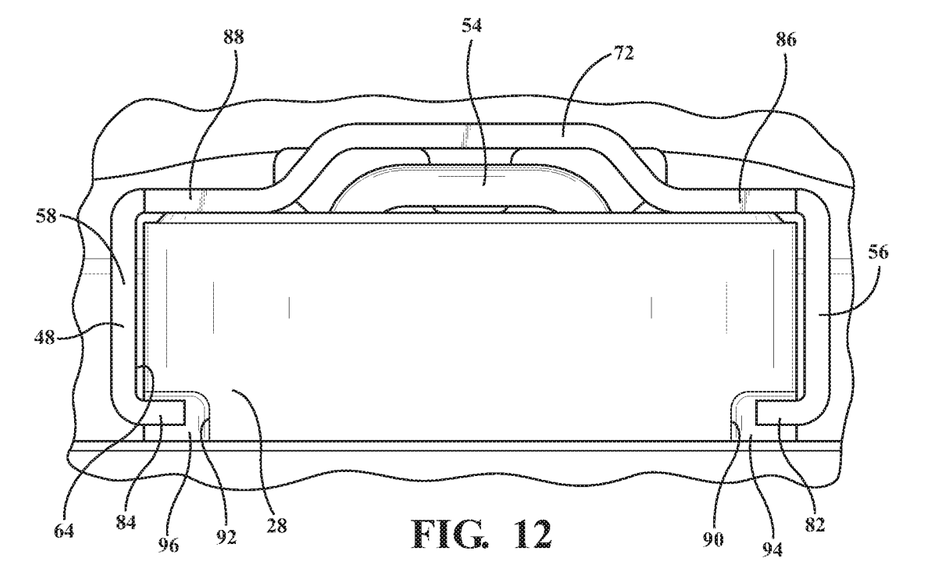
FIG. 12 is a rear view of the retainer and the yoke, with the retainer including a first retainer side extending along the axis, and a second retainer side extending along the axis and spaced from the first retainer side with respect to the axis, with the first and second retainer sides defining a retainer interior, and with the yoke disposed in the retainer interior.

In one embodiment, as shown in FIGS. 10 and 12, the retainer 48 includes a first retainer side 56 extending along the axis A, and a second retainer side 58 extending along the axis A and spaced from the first retainer side 56. The retainer 48 may also include a retainer projection 60 extending from at least one of the first and second retainer sides 56, 58 and configured to engage the interior wall 24, as shown in FIG. 5, when the yoke 28 is in the first yoke position to prevent contact of the yoke 28 with the interior wall 24.

Figure 9:
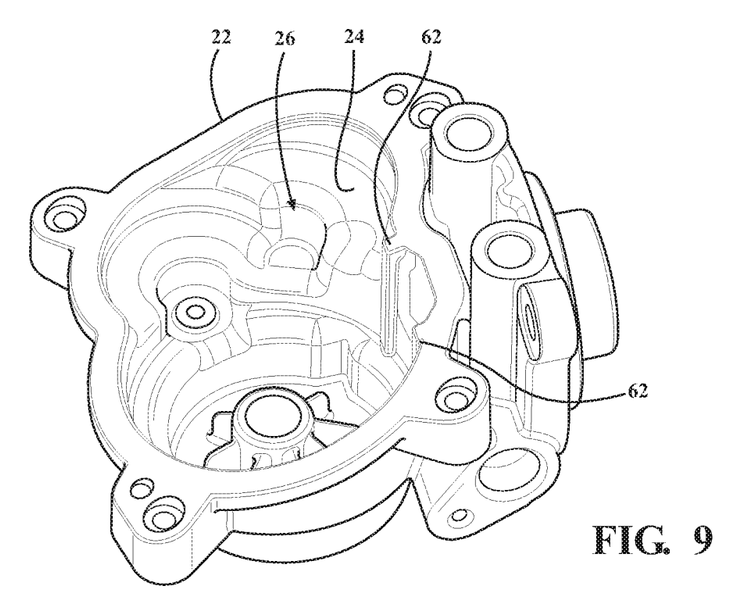
FIG. 9 is a perspective view of the housing, with the interior wall of the housing including at least one housing projection extending from the interior wall.

As shown in FIGS. 5, 6, and 9, the interior wall 24 may include at least one housing projection 62 extending from the interior wall 24 toward the retainer 48, with the housing projection 62 being configured to be engaged by the retainer 48. In some embodiments, when the retainer 48 includes the retainer projection 60 and the interior wall 24 includes the at least one housing projection 62, the at least one housing projection 62 is configured to be engaged by the at least one retainer projection 60 when the yoke 28 is in the first yoke position. When the interior wall 24 includes the at least one housing projection 62 and when the retainer includes the retainer projection 60, the retainer projection 60 and the at least one housing projection 62 are configured to engage each other such that when the valve member 30 experiences pulsation from the exhaust gas, the housing projection 62 and the retainer projection 60 are able to take repeated engagement of one another.

When the retainer 48 includes the first and second retainer sides 56, 58, the first and second retainer sides 56, 58 may define a retainer interior 64 and the yoke 28 may be disposed in the retainer interior 64, as shown in FIG. 12. When the first and second retainer sides 56, 58 define the retainer interior 64, the yoke 28 may be slidable with respect to the retainer 48. Additionally, when the retainer 48 includes the first and second retainer sides 56, 58, the first and second retainer sides 56, 58 may be parallel with respect to one another along the axis A.

The retainer 48 may include a support bridge 66 extending between the first and second retainer sides 56, 58 to support the biasing member 54, as shown in FIG. 10. To align the biasing member 54, the support bridge 66 may include a retention tab 68 extending perpendicular from the support bridge 66 and along the axis A. The support bridge 66 may have a lowered portion 70 extending into the retainer interior 64, with the retention tab 68 extending from the lowered portion 70 along the axis A.

The retainer 48 may include a third retainer side 72 coupled to and extending between the first and second retainer sides 56, 58. In such embodiments, the third retainer side 72 has a raised portion 74 extending away from the retainer interior 64 to accommodate the biasing member 54 in the retainer interior 64.

The yoke 28 include a first yoke side 76 extending adjacent the first retainer side 56 along the axis A, and a second yoke side 78 extending adjacent the second retainer side 58 along the axis A and spaced from the first yoke side 76 with respect to the axis A. When the first and second yoke sides 76, 78 are present, the yoke 28 may include a biasing seat 80 spaced from the support bridge 66 along the axis A extending between the first and second yoke sides 76, 78. In such embodiments, the biasing member 54 may be disposed between and coupled to the support bridge 66 and the biasing seat 80 to bias the yoke 28 and the retainer 48 in opposite directions with respect to one another along the axis A.

To further define the retainer interior 64, as shown in FIG. 12, the retainer 48 may include a first shelf 82 extending from the first retainer side 56 toward the second retainer side 58, and a second shelf 84 extending from the second retainer side 58 toward the first retainer side 56 to further define the retainer interior 64. The first and second shelves 82, 84 may further allow sliding of the yoke 28 with respect to the retainer 48. The retainer 48 may include a first tab 86 extending from the first retainer side 56 toward the second retainer side 58 and spaced from the first shelf 82, and a second tab 88 extending from the second retainer side 58 toward the first retainer side 56 and spaced from the second shelf 84. When present, the first and second tabs 86, 88 further define the retainer interior 64.

When the first and second shelves 82, 84 are present, and the yoke 28 includes the first and second yoke sides 76, 78, the first yoke side 76 may define a first notch 90 adjacent the first shelf 82 and extending along the axis A to receive the first shelf 82, and the second yoke side 78 may define a second notch 92 adjacent the second shelf 84 and extending along the axis A to receive the second shelf 84 to secure the yoke 28 in the retainer interior 64. In such embodiments, the first yoke side 76 may include a first stop 94 engageable by the first shelf 82 when the yoke 28 moves from the first yoke position to the second yoke position, and the second yoke side 78 may include a second stop 96 engageable by the second shelf 84 when the yoke 28 moves from the first yoke position to the second yoke position. The first and second stops 94, 96 prevent axial movement along axis A between the retainer 48 and the yoke 28. Specifically, the biasing member 54 biases the yoke 28 and the retainer 48 in opposite directions along the axis A, and the first and second stops 94, 96 prevent the biasing member 54 from further moving the retainer 48 and the yoke 28 away from one another. When the valve member 30 experiences pulsation from the exhaust gas, the retainer 48 may be engaged with the interior wall 24. In such instances, the yoke 28 may move with respect to the retainer 48 along the axis against the biasing of the biasing member 54. In such instances, the biasing member 54 dampens any movement of the yoke 28 along the axis A during pulsation of the exhaust gas to prevent the yoke 28 from contacting the interior wall 24 and to reduce free play of the yoke 28 and the valve member 30. Once pulsation of the exhaust gas ceases, the biasing member 54 continues to bias the yoke 28 away from the retainer 48 along the axis A until the first and second shelves 82, 84 engage the first and second stops 94, 96.

The first and second yoke sides 76, 78, may be parallel with respect to one another along the axis A. When the first and second yoke sides 76, 78, are parallel with respect to one another along the axis A, the first and second retainer sides 56, 58 may be parallel with respect to the first and second retainer sides 56, 58 to allow the retainer 48 and the yoke 28 to slide with respect to one another.

In one embodiment, the exhaust gas control valve 20 is used in an assembly 98, as shown in FIGS. 7 and 8, including an exhaust gas manifold. It is to be appreciated that the exhaust housing 40 shown in FIGS. 7 and 8 may be representative of the exhaust gas manifold or a seat on the engine itself. When the exhaust gas manifold is the exhaust housing 40, it is to be appreciated that the exhaust gas manifold may be adapted to be coupled to the engine. In such embodiments, the housing 22 of the exhaust gas control valve 20 is coupled to the exhaust gas manifold.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. An exhaust gas control valve for regulating a flow of exhaust gas, said exhaust gas control valve comprising:
   a housing having an interior wall defining a housing interior;
   a yoke disposed in said housing interior and having a length and an axis extending along said length, with said yoke being moveable between a first yoke position and a second yoke position different from said first yoke position along said axis;
   a valve member comprising a valve shaft having a first shaft end disposed in said housing interior and coupled to said yoke and a second shaft end spaced from said first shaft end, and a valve body adjacent said second shaft end and disposed outside said housing interior and coupled to and moveable with said valve shaft, with said valve member being moveable along said axis between a first valve position when said yoke is in said first yoke position and a second valve position when said yoke is in said second yoke position to regulate the flow of exhaust gas; and
   a retainer disposed in said housing interior and coupled to said yoke, with said retainer being moveable with said yoke when said yoke moves between said first and second yoke positions, and with said retainer being engageable with said interior wall when said yoke is in said first yoke position; and
   a biasing member disposed in said housing interior and coupled to said yoke and said retainer to bias said yoke and said retainer in opposite directions with respect to one another along said axis such that said retainer and said yoke are moveable with respect to one another along said axis, wherein said biasing member is configured to prevent free play of said yoke and said valve member with respect to said housing when said yoke is in said first yoke position.

2. The exhaust gas control valve as set forth in claim 1, wherein said retainer is slideably coupled to said yoke such that said yoke is moveable with respect to said retainer along said axis when said retainer is engaged with said interior wall to absorb movement of said valve member along said axis.

3. The exhaust gas control valve as set forth in claim 1, wherein said retainer is disengaged from said interior wall when said yoke is in said second yoke position, and wherein said yoke is spaced from said interior wall when said yoke is in said second yoke position such that said yoke does not contact said interior wall.

4. The exhaust gas control valve as set forth in claim 1, wherein said biasing member is configured to bias said yoke away from said interior wall to prevent contact of said yoke with said interior wall.

5. The exhaust gas control valve as set forth in claim 1, wherein said retainer comprises a first retainer side extending along said axis, a second retainer side extending along said axis and spaced from said first retainer side, and a retainer projection extending from at least one of said first and second retainer sides and configured to engage said interior wall when said yoke is in said first yoke position to prevent contact of said yoke with said interior wall.

6. The exhaust gas control valve as set forth in claim 1, wherein said interior wall comprises at least one housing projection extending from said interior wall toward said retainer, with said projection being configured to be engaged by said retainer.

7. The exhaust gas control valve as set forth in claim 1, wherein said valve member is further defined as a poppet valve.

8. The exhaust gas control valve as set forth in claim 1, further comprising an actuator coupled to said housing, with said yoke being moveable between said first and second yoke positions when said actuator is actuated.

9. The exhaust gas control valve as set forth in claim 8, further comprising a gear train disposed in said housing interior and coupled to said actuator, with said gear train being configured to be actuated by said actuator for moving said yoke between said first and second yoke positions.

10. The exhaust gas control valve as set forth in claim 9, wherein said gear train is rotatable when actuated by said actuator, and wherein said yoke is configured to translate rotational motion of said gear train into linear motion when said yoke moves between said first and second yoke positions along said axis.

11. The exhaust gas control valve as set forth in claim 1, wherein said retainer comprises a first retainer side extending along said axis, and a second retainer side extending along said axis and spaced from said first retainer side with respect to said axis, wherein said first and second retainer sides define a retainer interior, and wherein said yoke is disposed in said retainer interior.

12. The exhaust gas control valve as set forth in claim 11, wherein said first and second retainer sides are parallel with respect to one another along said axis.

13. The exhaust gas control valve as set forth in claim 11, wherein said retainer comprises a third retainer side coupled to and extending between said first and second retainer sides, and wherein said third retainer side has a raised portion extending away from said retainer interior to accommodate said biasing member in said retainer interior.

14. The exhaust gas control valve as set forth in claim 11, wherein said retainer comprises a support bridge extending between said first and second retainer sides to support said biasing member.

15. The exhaust gas control valve as set forth in claim 14, wherein said support bridge comprises a retention tab extending perpendicular from said support bridge and along said axis to align said biasing member.

16. The exhaust gas control valve as set forth in claim 15, wherein said support bridge has a lowered portion extending into said retainer interior, and wherein said retention tab extends from said lowered portion along said axis.

17. The exhaust gas control valve as set forth in claim 16, wherein said yoke comprises a first yoke side extending adjacent said first retainer side along said axis, a second yoke side extending adjacent said second retainer side along said axis and spaced from said first yoke side with respect to said axis, and a biasing seat spaced from said support bridge along said axis and extending between said first and second yoke sides, and wherein said biasing member is disposed between and coupled to said support bridge and said biasing seat to bias said yoke and said retainer in opposite directions with respect to one another along said axis.

18. The exhaust gas control valve as set forth in claim 11, wherein said retainer further comprises a first shelf extending from said first retainer side toward said second retainer side, and a second shelf extending from said second retainer side toward said first retainer side, wherein said first and second shelves further define said retainer interior.

19. The exhaust gas control valve as set forth in claim 18, wherein said retainer comprises a first tab extending from said first retainer side toward said second retainer side and spaced from said first shelf, and a second tab extending from said second retainer side toward said first retainer side and spaced from said second shelf, and wherein said first and second tabs further define said retainer interior.

20. The exhaust gas control valve as set forth in claim 18, wherein said yoke comprises a first yoke side extending adjacent said first retainer side along said axis, and a second yoke side extending adjacent said second retainer side along said axis and spaced from said first yoke side with respect to said axis, wherein said first yoke side defines a first notch adjacent said first shelf and extending along said axis to receive said first shelf, and wherein said second yoke side defines a second notch adjacent said second shelf and extending along said axis to receive said second shelf to secure said yoke in said retainer interior.

21. The exhaust gas control valve as set forth in claim 20, wherein said first yoke side comprises a first stop engageable by said first shelf when said yoke moves from said first yoke position to said second yoke position, and wherein said second yoke side comprises a second stop engageable by said second shelf when said yoke moves from said first yoke position to said second yoke position.

22. The exhaust gas control valve as set forth in claim 20, wherein said first and second yoke sides are parallel with respect to one another along said axis.

23. An assembly for controlling a flow of exhaust gas from an engine, said assembly comprising:
 an exhaust gas manifold adapted to be coupled to the engine; and
 an exhaust gas control valve comprising,
  a housing coupled to said exhaust manifold and having an interior wall defining a housing interior,
  a yoke disposed in said housing interior and having a length and an axis extending along said length, with said yoke being moveable between a first yoke position and a second yoke position different from said first yoke position along said axis,
  a valve member comprising a valve shaft having a first shaft end disposed in said housing interior and coupled to said yoke and a second shaft end spaced from said first shaft end, and a valve body adjacent said second shaft end and disposed outside said housing interior and coupled to and moveable with said valve shaft, with said valve member being moveable along said axis between a first valve position when said yoke is in said first yoke position and a second valve position when said yoke is in said second yoke position to regulate the flow of exhaust gas from the exhaust gas manifold,
  a retainer disposed in said housing interior and coupled to said yoke, with said retainer being moveable with said yoke when said yoke moves between said first and second yoke position, with said retainer being engageable with said interior wall when said yoke is in said first yoke position, and a biasing member disposed in said housing interior and coupled to said yoke and said retainer to bias said yoke and said retainer in opposite directions with respect to one another along said axis such that said retainer and said yoke are moveable with respect to one another along said axis, wherein said biasing member is configured to prevent free play of said yoke and said valve member with respect to said housing when said yoke is in said first yoke position.

* * * * *